April 17, 1956 G. W. BRADY 2,742,096
SPINNER SEAL
Filed July 1, 1953 2 Sheets-Sheet 1
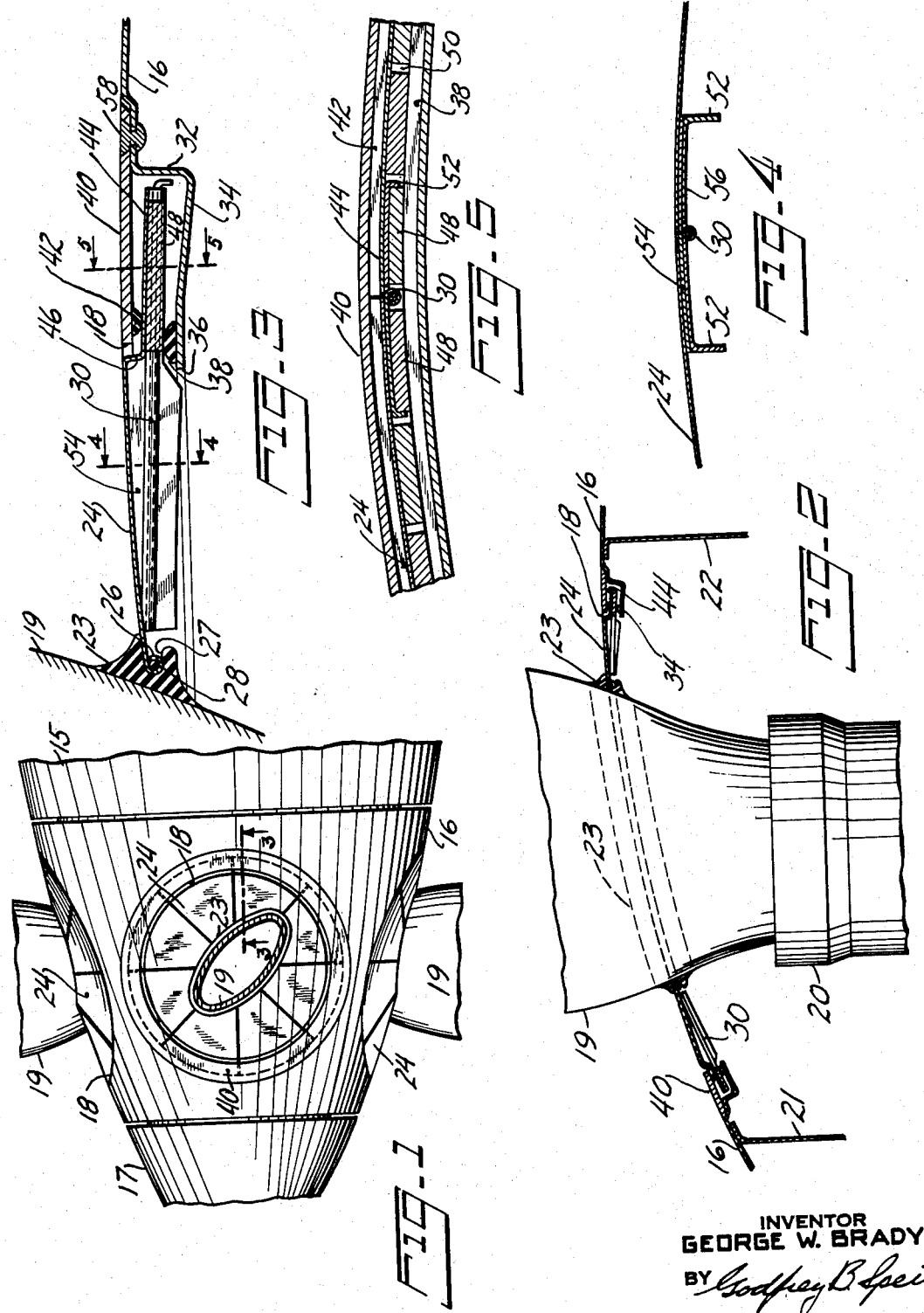
INVENTOR
GEORGE W. BRADY
BY
ATTORNEY April 17, 1956        G. W. BRADY        2,742,096
SPINNER SEAL
Filed July 1, 1953                               2 Sheets-Sheet 2
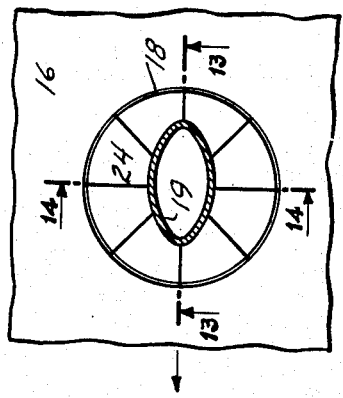 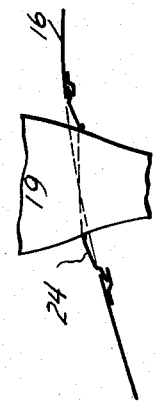 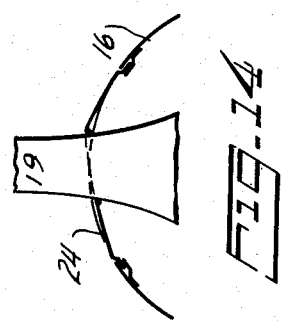
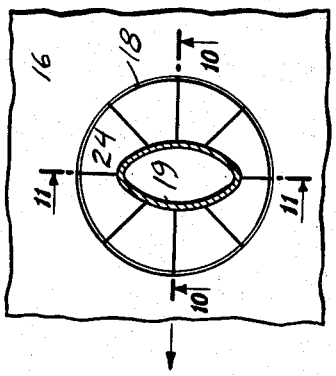 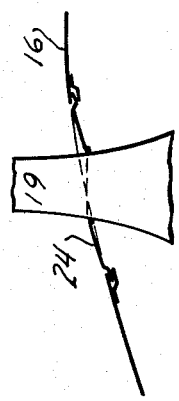 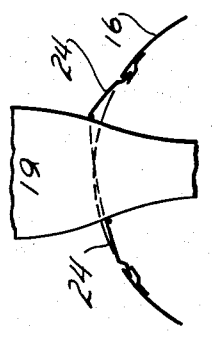
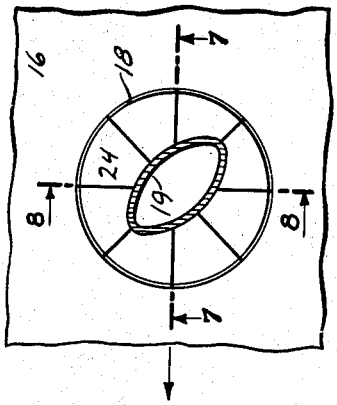  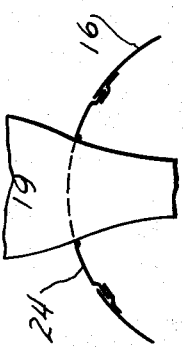
INVENTOR
GEORGE W. BRADY
BY
ATTORNEY

United States Patent Office 2,742,096
Patented Apr. 17, 1956

2,742,096

SPINNER SEAL

George W. Brady, Upper Montclair, N. J., assignor to Curtiss-Wright Corporation, a corporation of Delaware Application July 1, 1953, Serial No. 365,486

9 Claims. (Cl. 170—160.23)

This invention relates to propellers for aircraft and is concerned particularly with the sealing of the surfaces of streamlined propeller spinners.

It has long been conventional to provide a streamlined spinner around the hub of an aircraft propeller to reduce the aerodynamic drag thereof. A spinner necessarily has openings through which the blades of the propeller project, and the openings must be of such size and shape as to allow the propeller blades to rotate for pitch change. In older types of propellers, the blade shanks, where they passed through the spinner, were nearly circular in section so that the spinner openings could have small clearance relative to the blade shanks and the sealing of these openings was unimportant. More modern practice calls for propeller blades which have airfoil cross section from beneath the spinner surface outward to the propeller blade tip, so that the blade surface where it passes through the spinner, except at the leading and trailing edges of the blade, is widely spaced from the edge of the opening in the spinner. Since propeller blades require pitch change through a considerable angle, usually about 120°, an uncovered spinner opening creates a discontinuity in the spinner surface to create a large amount of drag during aircraft operation.

Spinners have the general shape of an ellipsoid of revolution, and blades project through them in zones where the spinner surface is sloped. Thus, a blade opening in the spinner surface, if the opening is generally circular, is developed from an axis which is tilted relative to the blade axis. When this opening is to be sealed by a disc which embraces the propeller blade, the disc must be able to articulate relative to the propeller blade as the blade rotates for pitch change, and the disc must also rotate on its own axis relative to the spinner. Since the spinner surface adjacent the opening is curved both longitudinally and transversely with different degrees of curvature, a considerable problem is created to design spinner seal discs which will conform to the spinner opening, which will lie close to the blade shank, which will articulate freely as the blade changes in pitch, and which will rotate freely in the spinner as the blade changes in pitch. With these several requirements, it is essential to minimize the weight and structural complexity of the sealing arrangement to avoid undue stresses in the structure resulting from the large centrifugal force on components, derived from spinner and propeller rotation.

Various spinner seals have been suggested in the prior art as solutions for the problem above indicated. The present invention proposes a spinner seal which is deemed to meet the requirements for such devices in a highly advantageous manner.

A further desirable characteristic of a spinner seal is to retain insofar as possible, the surface curvature of the spinner, in order to minimize drag of the system. No perfect solution to this problem is known to applicant, and it seems inevitable that some compromise must be made in the form of the spinner or of the spinner seals to provide an operative structure. In the present invention, an articulated spinner seal disc is provided, composed of a plurality of disc segments which are hinged to one another in edge to edge relation. The disc as a while is provided with an opening conformed to the profile of the propeller blade, the outer edge of the disc running in a track provided on the inner surface of the spinner adjacent the spinner opening. The disc segments are supported at their inner ends by the propeller blade and at their outer ends by the spinner so that adequate support is provided against centrifugal force. Since the disc segments will articulate relative to each other, their outer edges may conform effectively to the spinner curvature both longitudinally and transversely. The system is so designed that the most perfect streamlined configuration of the disc segments is obtained when the propeller blade is at a forward positive pitch angle close to that pitch angle which would occur when the aircraft is operating at the optimum design speed and altitude condition. As the blade pitch angle departs from the optimum condition, the spinner seal disc departs slightly from a true streamlined curvature, providing only a very slight drag increase when blade pitch is at an extreme angle. Such extreme angles occur when the propeller is feathered, when the propeller is operating at very low pitch for starting and take-off, and when the propeller is adjusted to provide reverse thrust.

The particular provisions of the invention may be understood by reading the following detailed description in connection with the drawings in which:

Fig. 1 is a plan of part of a spinner and propeller combination embodying the invention, Fig. 2 is a fragmentary longitudinal section through a portion of the spinner, showing part of the propeller and the spinner seal of the invention, Fig. 3 is an enlarged section on the line 3—3 of Fig. 1, Fig. 4 is a section on the line 4—4 of Fig. 3, Fig. 5 is a section on the line 5—5 of Fig. 3, Fig. 6 is a plan of the spinner seal and associated parts showing the propeller at a pitch angle within the normal operating range, Figs. 7 and 8 are sections on the lines 7—7 and 8—8 respectively of Fig. 6, Fig. 9 is a plan of the spinner seal and associated parts showing the propeller blade at substantially zero pitch angle, Figs. 10 and 11 are sections on the lines 10—10 and 11—11 respectively of Fig. 9.

Fig. 12 is a plan of the spinner seal and associated parts showing the propeller blade at feathering pitch angle, and Figs. 13 and 14 are sections on the lines 13—13 and 14—14 respectively of Fig. 12.

In the figures, a non-rotating cowling 15 represents the forward portion of a nacelle or the like relative to which a spinner 16 rotates, the spinner being a body of revolution and having a surface configuration whch is a somewhat conical streamlined forward prolongation of the cowling 15. The spinner 16 may have a forward streamlined nose portion 17 whch may either be rotating or non-rotating, as desired. The spinner 16 is provided with a plurality of substantially circular openings 18 through which propeller blades 19 project, each blade 19 being retained in a propeller hub within the spinner 16. Hubs are well known in the art and are not shown as such. A blade socket 20 is shown in Fig. 2, this being part of a hub.

The rotating spinner 16 is supported by bulkheads or diaphragms 21 and 22, in known manner, which diaphragms ordinarily are secured to the propeller hub. Each propeller blade 19, through known mechanisms associated with the propeller hub, may be controlled in pitch to move between a feathering pitch angle and a reverse pitch angle. The normal operative pitch angle of the blades is of the order of 15° to 55° to secure desired propulsive affect from the propeller. In multi-engine aircraft, feathering is resorted to upon engine failure or when it is desired not to use a particular engine and propeller, to minimize drag on the aircraft. Flat or zero pitch blade angle is utilized for engine starting under certain circumstances and negative pitch blade angle is used to secure a thrust reversal for aerodynamic braking of the aircraft during flight or upon landing.

In the normal cruise condition during which propeller blade angle lies between 15° and 55°, minimum drag on the system is desired. While low drag on the system is also desirable during feathering and reverse pitch operation, a slight increase can be afforded over that desired during cruising conditions since high speed is not usually expected of the aircraft at these times.

In the spinner seal of this invention, I provide a channel member 23 which embraces each propeller blade 19 and is securely bonded thereto. The flexible channel member 23 is positioned along the blade 19 in such a fashion that its curved plane lies in the curved plane of the spinner 16 when the propeller blade is at a mean normal pitch angle of, say, 40°. This normal pitch angle may deviate from the figure given, the pitch angle being selected according to the specific characteristics of the propeller and power plant system when alined with optimum or maximum or cruising speed, as selected, of the particular aircraft for which the installation is designed.

A plurality of spinner seal segments or leaves 24 are arranged around the propeller blade in edge to edge relationship, the inner end of each segment 24 being beaded as at 26 and formed to match part of the blade profile. These ends are inserted in a groove 27 running around the member 23. Accordingly, each segment 24 will have a different plan form depending upon its position around the propeller blade, some segments being attached near the blade leading edge, some near the blade trailing edge, some near the thrust surface of the blade, and some near the camber surface of the blade. To secure the several segments 24 to and around the propeller blade, a flexible cable or filament 28 is threaded through the various beads 26, the cable being secured at its end by any appropriate means.

With this arrangement, the several segments 24 may move up and down around the groove 27 as a pivot. Distortion necessarily present at the bead pivot, due to the curved form thereof, is assumed by the resilience of the member 23.

As shown in Figs. 3, 4 and 5, the segments 24 are hinged at their edges to one another by hinges 30. These hinges enable the segments 24 to articulate relative to one another while maintaining the edges of adjacent segments 24 alined with one another. This gives the disc comprised by the several segments a degree of flexibility, to enable it to accommodate to the non-uniform curvature of the spinner surface.

The spinner 16, all around the opening 18, is deformed inwardly as at 32 toward the propeller axis and then is deformed in a direction toward the blade axis as at 34 to provide an annular shelf or support rim defining a circular opening 36. To the shelf 34 near the opening 36 is secured an annular wear strip 38 having a low friction coefficient upon which outer edge portions of the segments 24 rest to prevent inward displacement. A ring 40 is secured flush with the spinner 16, the ring 40 defining the opening 18 and being furnished with an annular wear strip 42 against which outer surface portions of the segments 24 bear. The ring 40, firmly secured to the spinner 16, assumes the outward loading imposed by centrifugal force acting upon the several segments 24. The segments 24 may rotate bodily with the propeller blade during changes in pitch, sliding in a rotational direction between the annular wear strips 38 and 42. As the blade changes in pitch, due to the curvature of the spinner and the angled attachment of the member 23 to the propeller blade, the segments will flex relative to each other, move radially, or to right or left as shown in Fig. 3 between the annular strips 38 and 42, the outermost ends of the segments as at 44 lying between the ring 40 and the annular spinner portion 34.

To perfect the flushness of the segments 24 with the profile of the spinner 16 and the ring 40, the segments, toward their peripheries, are offset as at 46 to enable the inner segment portion to carry out the streamline of the spinner and the outer portion 44 to lie within the spinner profile.

To provide increased thickness throughout the periphery of the segments 24 near their edges, and to accommodate the thickness of the hinges 30, a plurality of blocks 48, of segmental form, are secured to the segment portions 44 on their inner surfaces. These blocks build up the segment edges to a thickness corresponding to the gaps between the annular wear strips 38 and 42. These blocks are spaced apart as shown at 50, to permit the edges 44 of the segments to flex a slight amount, to enable the segments to conform to the curvature of the spinner opening 18 as the segments move relative to the ring 40 when the propeller blade changes pitch. The segments 24 are reinforced against bending in a radial direction by the hinges 30 and also by flanges 52 which may if desired be formed as portions of the hinges 30. Where the axis of the hinge 30 departs from the inner surface of the segment 24, suitable tapered shims 54 may be interposed between the segment and the hinge wings 56. The hinge and segment elements may be secured to one another permanently, as by spot welding. Blocks 48 may be secured to the segment structure by any suitable means and the blocks may be made from a light weight plastic material, or of light metal. The ring 40, defining the spinner opening 18 may be secured to the spinner as by rivets 58 or other suitable attachment means.

The member 23 embracing the propeller blade 19 may be fabricated from an elastomer such as resilient plastic or rubber-like material and known techniques may be employed to bond this member securely to the surface of the propeller blade.

The outward force developed in the segments 24 due to propeller and spinner rotation is assumed by the spinner at the outer ends of the segments and by the propeller blade at the inner ends of the segments. Since the blade is firmly secured in the hub socket 20, against the effects of centrifugal force on the relatively large blade, this attachment will readily assume the centrifugal loading of the segments 24. The entire spinner seal assembly of segments 24 is driven rotationally about the propeller blade axis with the propeller blade by the engagement of the segments with the propeller blade.

Figs. 6–14 show the propeller blade and spinner seal segments in various positions of blade pitch, and show the approximate relative positions of the spinner seal segment surfaces with respect to the spinner profile. Figs. 7 and 8 show that the spinner seal segments in the normal pitch position of the blade noted in Fig. 6, lie in the profile of the spinner to provide optimum streamlining of the spinner seal.

Fig. 9 shows the propeller blade 19 in a flat pitch position, and Figs. 10 and 11 show the angular deviation of the profile of the spinner seal segments from the normal spinner profile at the flat blade angle. Maximum deviation of the spinner segments occurs at this blade angle on the right side of Fig. 11, showing the relatively minor departure of spinner seal segments from true streamlining under this worst condition.

Fig. 12 shows the propeller blade at feathered pitch angle while Figs. 13 and 14 show the angular deviation of the profile of the spinner seal segments at this pitch angle condition. These deviations are accentuated in the drawings; it will be appreciated that a relatively small departure from true streamlining occurs through all conditions of blade pitch angle, so far as the spinner seal segments are concerned.

While the number of spinner seal segments 24 in the drawings is noted as eight, a larger or smaller number of segments may be utilized as desired for any particular design. A larger or smaller number of segments may be desirable depending upon the diameter of the spinner, the taper thereof, and the number and size of blade openings which may be required in accordance with the number of blades in the propeller and the chord of the blades where the blades intercept the spinner profile.

Though a single embodiment of the invention is shown, it is to be understood that the invention may be applied in other forms and in various environments. Changes may be made in the arrangements shown without departing from the spirit of the invention. Reference should be had to the appended claims for definition of the limits of the invention.

What is claimed is:

1. In a rotating spinner in combination with a blade of an aeronautical propeller, a portion of said spinner adjacent said blade having a circular opening through which said blade passes, a plurality of edge-to-edge leaves around the blade each having a portion articulately secured thereto, other portions of said leaves bridging said opening and still other portions underlying the spinner opening edge for support thereby against outward displacement, said leaves being articulately hinged to one another along their radial edges and having sector-like plan form.

2. A seal for an aircraft spinner, in combination with a changeable pitch propeller blade projecting through a spinner opening, comprising a plurality of separate leaves secured articulately at their one ends to and around the propeller blade and articulately secured at their lateral edges to one another, said leaves underlying the spinner opening edge at their other ends, said leaves being rotatable with the blade and bridging the opening gap between the blade and the opening edge.

3. A seal for an aircraft spinner, in combination with a changeable pitch propeller blade projecting through a spinner opening, comprising a plurality of separate leaves secured articulately at their one ends to and around the propeller blade and articulately secured at their lateral edges to one another, said leaves underlying the spinner opening edge at their other ends, said leaves being rotatable with the blade and bridging the opening gap between the blade and the opening edge, and means bordering said spinner opening secured within the spinner against which the inner surface of said other ends of said leaves bear.

4. In a spinner for an aircraft propeller, said spinner having an opening through which a propeller blade projects, a resilient member embracing the blade and adapted to be secured thereto on a line which intercepts a continuation of the longitudinal and transverse spinner profile when the blade is in a positive pitch position, a plurality of segmental leaves around the blade articulately hinged to one another at their lateral edges and secured at their one ends to said resilient member, and means for holding the other ends of said leaves in movable and sealing relation to the spinner edge adjacent said opening.

5. In a spinner for an aircraft propeller, said spinner having an opening through which a propeller blade projects, a resilient member embracing the blade and adapted to be secured thereto on line which intercepts a continuation of the longitudinal and transverse spinner profile when the blade is in a positive pitch position, a plurality of segmental leaves around the blade articulately hinged to one another at their lateral edges and secured at their one ends to said resilient member, and means for holding the other ends of said leaves in movable and sealing relation to the spinner edge adjacent said opening, said leaves including radially disposed reinforcement to stiffen them against bending between the spinner and the resilient member.

6. In a spinner for an aircraft propeller, said spinner having an opening through which a propeller blade projects, a resilient member embracing the blade and adapted to be secured thereto on line which intercepts a continuation of the longitudinal and transverse spinner profile when the blade is in a positive pitch position, a plurality of segmental leaves around the blade secured at their one ends to said resilient member, means for holding the other ends of said leaves in movable and sealing relation to the spinner edge adjacent said opening and a hinge between adjacent leaves having its wings secured to said leaves.

7. In a spinner for an aircraft propeller, said spinner having an opening through which a propeller blade projects, a resilient member embracing the blade and adapted to be secured thereto on line which intercepts a continuation of the longitudinal and transverse spinner profile when the blade is in a positive pitch position, a plurality of segmental leaves around the blade secured at their one ends to said resilient member and articulately hinged to one another at their lateral edges, means for holding the other ends of said leaves in movable and sealing relation to the spinner edge adjacent said opening, a support rim underlying said leaves within said spinner, and a plurality of spacing devices secured to said leaves to partially bridge the gap between said support rim and the edge of said spinner opening.

8. In a spinner for an aircraft propeller, said spinner having an opening through which a propeller blade projects, a resilient member embracing the blade and adapted to be secured thereto on line which intercepts a continuation of the longitudinal and transverse spinner profile when the blade is in a positive pitch position, a plurality of segmental leaves around the blade secured at their one ends to said resilient member and articulately hinged to one another at their lateral edges, means for holding the other ends of said leaves in movable and sealing relation to the spinner edge adjacent said opening, a support rim underlying said leaves within said spinner, and a plurality of spacing devices secured to said leaves to partially bridge the gap between said support rim and the edge of said spinner opening, said leaves being offset whereby the portions thereof close to the blade lie substantially flush with the spinner contour, and the portions thereof remote from the blade underlie the spinner.

9. In a spinner for a propeller the spinner embracing the hub of the propeller and having a substantially circular opening, the propeller having a controllable pitch blade projecting through said opening, a member embracing and secured to the blade in a position to lie in an extension of the curved contour of the spinner when the blade is at a normal positive pitch angle, a plurality of sheet metal segments embracing the blade and consecutively bordering one another, means to hingedly secure an end of each segment to said member, the opposite end of each segment underlying the edge of a part of the spinner opening, and said segments being bodily movable relative to said spinner as the blade pitch is changed.

References Cited in the file of this patent

UNITED STATES PATENTS

| | | |
|---|---|---|
| 2,125,187 | Lansing | July 26, 1938 |
| 2,421,841 | Lowy | June 10, 1947 |
| 2,612,227 | Cushman | Sept. 30, 1952 |
| 2,614,638 | Beaupre | Oct. 21, 1952 |

FOREIGN PATENTS

| | | |
|---|---|---|
| 1,005,353 | France | Apr. 9, 1952 |